UNITED STATES PATENT OFFICE.

CARL AUGUST ALBERT HERMANN SIEBERT, OF LEIPSIC, SAXONY, GERMANY.

SUBSTITUTE FOR GUTTA-PERCHA.

SPECIFICATION forming part of Letters Patent No. 411,171, dated September 17, 1889.

Application filed November 3, 1887. Serial No. 254,208. (No specimens.)

*To all whom it may concern:*

Be it known that I, CARL AUGUST ALBERT HERMANN SIEBERT, of Leipsic, in the Kingdom of Saxony and Empire of Germany, have invented certain new and useful Improvements in Substitutes for Gutta-Percha, of which the following is a specification.

This invention relates to an improved substitute for gutta-percha; and the invention consists of a gutta-percha substitute composed of asphaltum, balsam of sulphur, and an easily-melting hydrocarbon, such as paraffine, stearine, wax, and the like.

In the practical production of my improved gutta-percha substitute one part of asphaltum, one-fourth to one part of balsam of sulphur, and up to one-half a part of paraffine, stearine, or wax have given good results.

One of the best compositions obtained by practical experiments is prepared as follows: Seventy-five parts of Mexican asphaltum are melted and mixed with so-called "balsam of sulphur," which is prepared of nineteen parts of rape-seed oil and six to eight parts of sulphur, at a temperature of about 150° Celsius. In place of rape-seed oil, any other fatty oil can be employed. To the balsam of sulphur are added eight to fifteen parts of paraffine; but this may also be added after the balsam of sulphur has been mixed with the asphaltum, which is accomplished while the latter is in melted condition. The mass is then left to cool, and put aside so as to settle for about six to eight weeks. In place of allowing the composition to settle, it may be kept in melted condition for about one hour or two at a temperature of from 150° to 200° Celsius, whereby the elasticity of the resulting body is increased. The substance thus obtained possesses the principal qualities of gutta-percha and may be used in place of the same. It differs from gutta-percha in being somewhat softer and having somewhat less elasticity and toughness. These defects, however, may be overcome to a great degree by the admixture of substances like rubber, bone-dust, sulphur, animal charcoal, fiber, leather shavings or dust, or other substances that are usually employed in the manufacture of gutta-percha.

Having thus described my invention, I claim as new and desire to secure by Letters Patent—

A gutta-percha substitute consisting of a mixture of asphaltum, balsam of sulphur, and an easily-melting solid hydrocarbon, substantially as set forth.

In testimony whereof I have signed my name to this specification in the presence of two subscribing witnesses.

CARL AUGUST ALBERT HERMANN SIEBERT.

Witnesses:
 CARL BORNGRAEBER,
 WILLIAM F. H. HEFFTER.